United States Patent [19]

Suzuki et al.

[11] Patent Number: 5,401,957
[45] Date of Patent: Mar. 28, 1995

[54] OPTICAL WAVEFORM SHAPING DEVICE FOR PEFORMING WAVEFORM EQUALIZATION AND TIMING SYNCHRONIZATION

[75] Inventors: Masatoshi Suzuki, Kawashima; Noboru Edagawa, Ichigayata; Hideaki Tanaka, Koganei; Shu Yamamoto, Shiki; Yuichi Matsushima, Tokorozawa, all of Japan

[73] Assignee: Kokusai Denshin Denwa Kabushiki Kaisha, Tokyo, Japan

[21] Appl. No.: 215,887

[22] Filed: Mar. 21, 1994

Related U.S. Application Data

[63] Continuation of Ser. No. 7,514, Jan. 22, 1993, abandoned.

[30] Foreign Application Priority Data

| Feb. 3, 1992 | [JP] | Japan | 4-046391 |
| Apr. 23, 1992 | [JP] | Japan | 4-129354 |

[51] Int. Cl.⁶ ............................. H01J 5/16
[52] U.S. Cl. ..................... 250/227.21; 359/187
[58] Field of Search .............. 250/227.12, 551, 214 R, 250/214 C, 227.21, 227.11; 359/140, 176, 179, 195, 187, 174, 175

[56] References Cited

U.S. PATENT DOCUMENTS

| 4,809,256 | 2/1989 | Smith et al. | 359/140 |
| 4,972,513 | 11/1990 | Mochizuki et al. | 359/179 |
| 4,980,891 | 12/1990 | Izadpanah . | |
| 4,991,975 | 2/1991 | Alferness et al. . | |
| 5,111,322 | 5/1992 | Bergano et al. | 359/140 |

(List continued on next page.)

FOREIGN PATENT DOCUMENTS

| 0534433A2 | 3/1993 | European Pat. Off. . |
| 2219903 | 12/1989 | United Kingdom . |

OTHER PUBLICATIONS

Korotky and Veselka, "TUH2 Efficient switching in a 72-Gbit/s Ti:LiNbO₃ binary multiplexer/demultiplexer" (1990).

Nakazawa et al., "10 Gbit/s Soliton Data Transmission over One Million Kilometers" (1991) *Electronics Letters*, pp. 1270–1272.

European Search Report, FMC/009/7514; 21 Oct. 1993.

Suzuki et al., "Transform-Limited 14 ps Optical Pulse Generation with GHz Repetition Rate by InGaAsP Electroabsorption Modulator" (1992).*pp. 1007–1008.

Eisenstein, et al. "Active Mode-Locking Charatenstics of InGaAsP-Single Mode Fiber Composite Cavity Lasers" (1986) *J. of Quantum Electronics*, pp. 142–148.

Tucker et al., "40 GHz Active Mode-Locking in a 1–5 m Monolithic Extended-Cavity Laser," (1989) Electronics Letters, pp. 621–622.

(List continued on next page.)

*Primary Examiner*—David C. Nelms
*Attorney, Agent, or Firm*—Emmanuel J. Lobato

[57] ABSTRACT

To perform waveform shaping, retiming and amplification of the transmitted pulse signal of a binary PCM fiber optic communication employing an optical pulse signal which has a pulse duty factor within 1 with respect to a time slot, an optical waveform shaping device is proposed in which the optical pulse signal is branched by an optical branch circuit into two optical signals. The one transmitted optical signal passes through a photodetector, a band-pass filter for extracting the fundamental frequency component of the signal, an amplifier and a delay circuit, so that the signal is converted to a sinusoidal voltage synchronized with the optical pulse signal. The other optical signal passes through a semiconductor electrical absorption type optical modulator which is driven by the sinusoidal voltage and a DC voltage, so that the width of a gate waveform is changed by controlling the amplitude of the sinusoidal voltage and the DC voltage.

6 Claims, 6 Drawing Sheets

U.S. PATENT DOCUMENTS 5,162,936  11/1992  Taga et al. .............................. 359/177
5,166,509  11/1992  Curran ................................... 359/187
5,184,244   2/1993  Nishimura et al. ................... 359/187

OTHER PUBLICATIONS

Wu et al., "Transform-limited 1.4 ps optical pulses from a monolithic colliding-pulse mode-locked quantum well laser," (1990) *Appl. Phys. Lett.*

Nakazawa et al., "Transform-limited pulse generation in the gigahertz region . . . " (1990) *Optics Letters*, pp. 715–717.

Suzuki et al., "High-Speed Characteristics at High Input Optical Power of GaInAsP Electroabsorption Modulators" (1988) *Electronics Letters*, pp. 1272–1273.

Wood et al., "100 ps Waveguide Multiple Quantum Well (MQW) Optical Modulator with 10:1 On/Off Ratio" (1985) Electronics Letters, pp. 693–694.

Gordon and Mollenauer, "Effects of Fiber Nonlinearities and Amplifier Spacing on Ultra-Long Distance Transmission" (1991) *J. of Lightwave Tech.*, pp. 170–173.

Partial European Search Report EP 93 30 0773, Feb. 8, 1993.

Tanaka et al., "5-Gb/s Performance of Integrated Light Source Consisting of λ-Shifted DFB Laser . . . " (1990) J. of Lightwave Tech., pp. 1357–1362.

Taga et al., "Bit Error Rate Measurement of 2–5 Gbit/s Data Modulated Solitons Generated by InGaAsP EA Modulator . . . " (1992) *Electronics Letters*, pp. 1200–1201.

Suzuki et al., "Application of a λ/4–Shifted DFB Laser/Electroabsorption Modulator Monolithically Integrated Light Source . . . " (1992) *Phototonics Technology Letters*.

M. Suzuki, H. Tanaka and Y. Matsushima, "10 Gbit/s Optical Demultiplexing and Switching by Sinusoidally Driven InGaAsP Electroabsorption Modulators" Electronic Letters vol. 28, No. 10, pp. 934–935 May 1992.

P. B. Hansen, G. Raybon, J. M. Wiesenfeld, C. A. Burrus, R. A. Logan, T. Tanbun Ek, and H. Temkim, "Optical Demultiplexing at 6 Gb/s Using a Semiconductor Laser Amplifier as an Optical Gate", Transactions Phototonics Techology Letters vol. 3 No. 11 Nov. 1991 pp. 1018–1020.

P. A. Andrekson, N. A. Olsson, J. R. Simpson, T. Tanbun-Ek, R. A. Logan, and M. Haner, "16 Gbit/s All-Optical Demultiplexing Using Four-Wave Mixing" Electronic Letters vol. 27 No. 11 May 1991 pp. 922–924.

L. F. Mollenauer, E. Lichtman, G. T. Harvey, M. J. Neubelt, and B. M. Nyman, "Demonstration of error-free soliton transmission over more than 15,000 km at 5 Gbit/s, single-channel, and over 11,000 km at 10 Gbit/s in a two-channel WDM" (unknown date).

M. Suzuki, H. Tanaka, and S. Akiba, "Effect of Hole Pile-Up at Heterointerface on Modulation Voltage in GaInAsP Electroabsorption Modulators" Electronic Letters vol. 25 No. 2 Jan. 1989 pp. 88–89.

OPTICAL WAVEFORM SHAPING DEVICE FOR PEFORMING WAVEFORM EQUALIZATION AND TIMING SYNCHRONIZATION

This is a continuation of application Ser. No. 08/007,514, filed Jan. 22, 1993, now abandoned.

BACKGROUND OF THE INVENTION

The present invention relates to an optical waveform shaping device which performs waveform equalization and timing synchronization for a high-speed digital fiber optic communication by the use of an optical pulse signal having a pulse duty factor within 1 with respect to a time slot.

With the recent progress of optical amplification techniques, the fiber optic communication technology permits realization of an ultra-long distance transmission across the Pacific Ocean, for instance, without using any conventional regenerative repeaters. With this linear optical amplifying-repeating transmission, however, as the transmission rate increases, the transmitted waveform undergoes gradual deterioration which is caused by the wavelength dispersion characteristic and nonlinear optical effect of the optical fiber used, imposing limitations on the ultra-high-speed long distance transmission. In recent years an optical soliton communication system has been in the limelight as a system which surmounts the limitations on the speeding up of transmission owing to the wavelength dispersion characteristic and nonlinear optical effect. The optical soliton system is one that makes positive use of the wavelength dispersion characteristic and nonlinear optical effect of the optical fiber which are contributing factors to the deterioration of the transmission characteristic of the above-mentioned prior art system and that transmits short optical pulses intact while balancing their broadening by the wavelength dispersion in the optical fiber and their compression by the nonlinear optical effect. A time multiplex and a wavelength multiplex system are also relatively easy to implement and are suitable for high-speed, large-capacity transmission.

In case of implementing the optical soliton communication system of large optical amplifying repeater spacing by selecting the amplifier gain large in a transpacific or similar ultra-long distance optical amplification system, a noise component of light spontaneously emitted from each optical amplifier increases and as the distance of transmission increases, such noise components are accumulated, causing a decrease in a signal to noise ratio of the whole system and hence deteriorating receiving characteristics. The main factor in deterioration of the receiving characteristics is a timing jitter resulting from a random velocity modulation of optical soliton pulses which is caused by the interaction of the accumulated noise components and the nonlinear optical effect of the optical fiber. If the pulse to be received, accompanied by the timing jitter, does not arrive within the time slot of a signal, an error will be induced. To avoid this, it is necessary that the gain of the amplifier be low to suppress the noise, and the spacing of the optically amplifying repeaters becomes relatively small.

On the other hand, there has been proposed a method which prevents an increase of such a timing jitter by retiming and waveform shaping of the transmitted signal by an optical modulator after allowing the passage of the signal through a certain number of optical amplifying repeaters (Publication 1; M. Nakazawa et al., "10 Gbit/s soliton data transmission over one million kilometers," Electronics Letters, Vol. 27, pp. 1270–1272, July 1991). According to publication 1, a 510-km loop is prepared which is formed by optical amplifiers and optical fibers, an $LiNbO_3$ optical modulator inserted in the loop is driven by an electric signal synchronized with a transmitted code to provide a gate on the time domain, retiming and waveform shaping of the transmitted signal are performed by the gate and optical pulses are propagated through the loop, thereby simulating a long distance optical fiber transmission.

According to Publication 1, however, since the $LiNbO_3$ optical modulator is used which utilizes interference of light beams of specified wavelengths and specified directions of polarization, the gate waveform on the time domain is fixed and it is impossible to erase or remove accumulated noise having a spectral component of a wide time domain over which the gate is closed. Moreover, since the state of local polarization of the transmission system varies with time in the actual system, the modulation characteristic of the $LiNbO_3$ optical modulator also varies with time, and hence the $LiNbO_3$ optical modulator cannot be used.

SUMMARY OF THE INVENTION

It is therefore an object of the present invention to provide an optical waveform shaping device which permits the formation of an arbitrary time domain gate waveform and the elimination of accumulated noise and which allows the retiming and waveform shaping of the transmitted pulse signal regardless of the state of polarization of incident light.

To attain the above object, a first optical waveform shaping device according to the present invention comprises: an optical branch circuit for branching an input optical pulse signal into two optical pulse signals; a semiconductor electro-absorption type optical modulator for modulating one of the two branched optical pulse signals from the optical branch circuit to perform its optical waveform shaping and retiming; a photodetector for receiving the other optical pulse signal branched from the optical branch circuit and for converting it into an electric signal; a band-pass filter for permitting the passage therethrough of only a substantially sinusoidal voltage synchronized with a bit rate of the input optical pulse signal, which is the fundamental frequency component of the electric signal converted by the photodetector; an amplifier for amplifying the sinusoidal voltage having passed through the band-pass filter; a DC voltage source for supplying a DC voltage to the semiconductor electro-absorption type optical modulator; and a delay circuit for delaying the sinusoidal voltage amplified by the amplifier and the DC voltage from the DC voltage source and for applying the delayed outputs to the semiconductor electro-absorption type optical modulator.

A second optical waveform shaping device comprises: a first optical branch circuit for branching an input time-multiplexed optical pulse signal into a plurality of optical pulse signals; a plurality of second optical branch circuits each for further branching one of a plurality of optical pulse signals branched from the first branch circuit into two optical pulse signals; a plurality of semiconductor electro-absorption type optical modulators each for modulating one of the optical pulse signals branched from one of the plurality of second optical branch circuits to perform its optical waveform shaping and retiming synchronization of the optical pulse signal; a plurality of photodetectors each for receiving the other optical pulse signal from one of the second optical branch circuits and for converting it into an electric signal; a plurality of band-pass filters each for obtaining from the electric signal converted by one of the photodetectors a substantially sinusoidal voltage synchronized with a bit rate of the input optical pulse signal prior to its time multiplexing, which is the fundamental frequency component of the optical pulse signal prior to its time multiplexing; a plurality of amplifiers each for amplifying the sinusoidal voltage having passed through one of the band-pass filters; a plurality of DC voltage sources each for supplying a DC voltage to one of the semiconductor electro-absorption type optical modulators; and a plurality of delay circuits each for delaying the amplified sinusoidal voltage and a reverse DC voltage from the DC voltage source and for applying the delayed outputs to one of the semiconductor electro-absorption type optical modulators. The characteristics of the delay circuits, the DC voltage sources and the amplifiers are preselected so that at least one desired series of optical pulse signals is derived from the time-multiplexed optical pulse signals obtained through any of the semiconductor electro-absorption type optical modulators.

A third optical waveform shaping device is one that performs waveform shaping, retiming and amplification for binary PCM fiber optic communication by the use of an optical pulse signal having a pulse duty factor within 1 with respect to a time slot. The optical pulse signal is branched by an optical branch circuit into two optical pulse signals. One of the two optical pulse signals is applied to a photodetector, a band-pass filter for extracting the substantially fundamental frequency component of the photodetector output, an amplifier and a delay circuit to obtain a substantially sinusoidal voltage synchronized with a bit rate of the optical pulse signal. The other optical pulse signal is applied to a semiconductor electro-absorption type optical modulator which is driven by the sinusoidal voltage and a DC voltage from a DC voltage source. By changing the amplitude of the sinusoidal voltage and the DC voltage which are used to drive the semiconductor electro-absorption type optical modulator, the width of a gate waveform on the time domain of the semiconductor electro-absorption type optical modulator is changed to perform the waveform equalization and retiming synchronization of the optical pulse signal.

A fourth optical waveform shaping device is one that performs waveform shaping, retiming and amplification for time-sharing separation of a multiplexed signal in a binary PCM fiber optic communication by the use of a signal obtained by time-division multiplexing an optical pulse signal into a plurality of pulse trains through so-called bit interleaving, and the optical pulse signal having a pulse duty factor within 1 with respect to a time slot. The optical pulse signal is branched into a plurality of optical pulse signals, each of which is further branched by an optical branch circuit into two optical pulse signals. One of the two branched optical signals is converted by a photodetector into an electric signal, after which the substantially fundamental frequency of the bit rate of the optical pulse signal prior to its multiplexing is extracted, and the thus extracted output is applied to an amplifier and a delay circuit to obtain a substantially sinusoidal voltage synchronized with a bit rate of the optical pulse signal prior to its multiplexing. The other branched optical pulse signal is provided to a semiconductor electro-absorption type optical modulator which is driven by the sinusoidal voltage and a DC voltage from a DC voltage source. By changing the amplitude of the sinusoidal voltage and the DC voltage which are used to drive the semiconductor electro-absorption type optical modulator, the optical modulator is controlled so that the gate width on the time domain is smaller than the time width which is a reciprocal of the transmission rate of the multiplexed optical pulse signal and at least one series of pulse signals is separated from the multiplexed signal. The thus separated optical pulse signal is subjected to waveform equalization and retiming synchronization.

As described above, according to the present invention, the semiconductor electro-absorption type optical modulator, which is not affected by the state of polarization of the input pulse signal light, is used to perform its retiming and waveform shaping at the signal transmission rate and, in the case of a time-multiplexed signal, the transmission rate prior to its multiplexing. Moreover, the gate width on the time domain can be altered by changing the DC voltage, which is applied to the semiconductor electro-absorption type optical modulator, and the sinusoidal voltage synchronized with a bit rate of the input pulse signal or a bit rate of the signal prior to its multiplexing.

BRIEF DESCRIPTION OF THE DRAWINGS

The present invention will be described in detail below with reference to accompanying drawings, in which.

PREFERRED EMBODIMENTS OF THE INVENTION

EMBODIMENT 1

Figure 1:
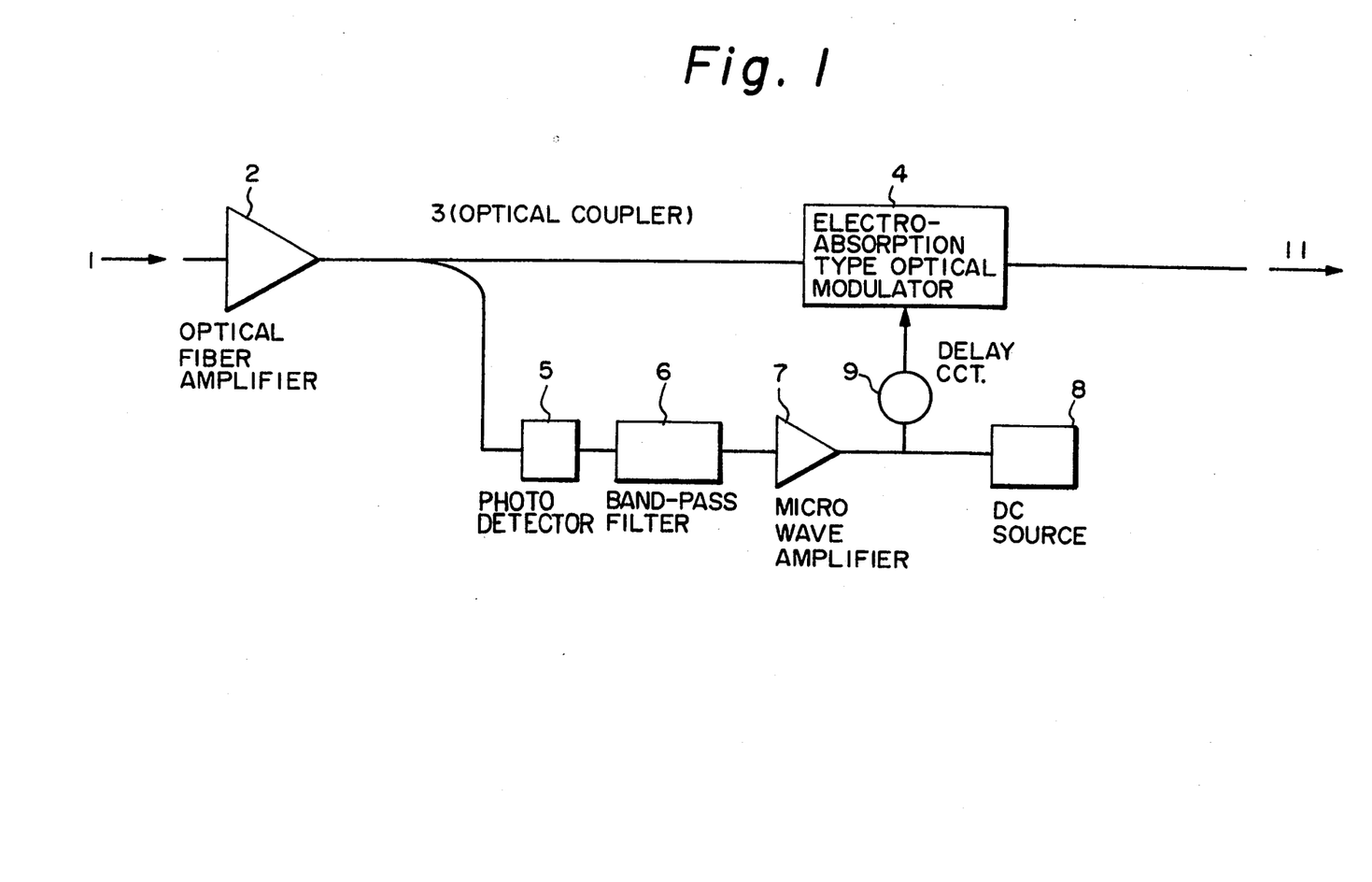
FIG. 1 is a block diagram illustrating an optical waveform shaping device as an optical repeater which employs a semiconductor electro-absorption type optical modulator according to a first embodiment of the present invention.
Figure 2:
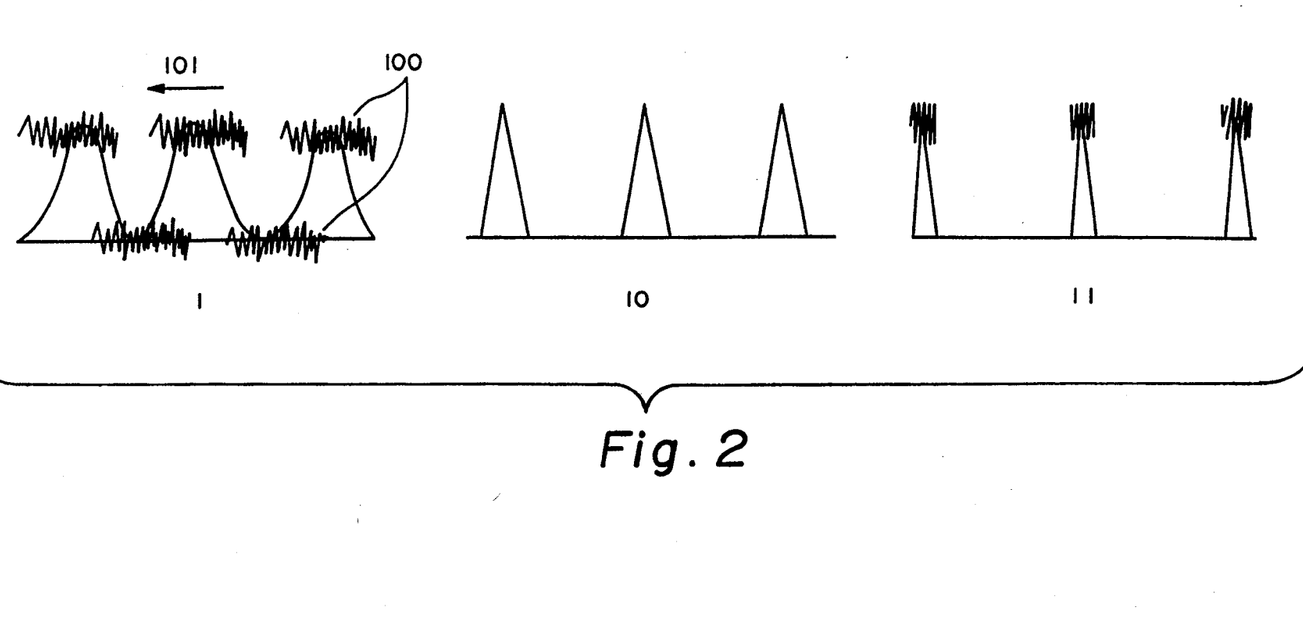
FIG. 2 is a diagram showing operating waveforms in the embodiment of FIG. 1.

A description will be given first of the operation principle of the invention. In FIG. 1 a transmitted optical signal 1 is one that has been transmitted over a long distance optical fiber of an optical amplifying-repeating system and contains accumulated noise 100, which is the sum total of noise components by a plurality of optical amplifiers of the transmission system, and timing jitters 101 as shown in FIG. 2. In FIG. 1 the transmitted optical signal 1 is amplified by an optical fiber amplifier 2 and is then branched by an optical coupler 3 into two, one of which is applied to an InGaAsP electro-absorption type optical modulator 4. The other optical signal is converted by a photodetector 5 into an electric signal, which is applied to a band-pass filter 6 to extract substantially the fundamental frequency component only synchronized with a bit rate of the input optical signal. The filter output is amplified by a microwave amplifier 7 to generate a sinusoidal voltage, on which a reverse bias voltage from a DC voltage source 8 is superimposed. The sinusoidal voltage is then applied to a delay circuit 9, by which it is synchronized with a bit rate of the transmitted optical signal 1 so that the peak position of the former matches with that of the latter. Thereafter, the sinusoidal voltage is applied to the InGaAsP electro-absorption type optical modulator 4 to drive it. Incidentally, the optical fiber amplifier 2 is used to compensate for optical loss which is caused by branching or the like, and it may be omitted when the intensity of the optical signal 1 is sufficiently high.

In this embodiment, the transfer function of the optical modulator 4 in the time domain, that is, the pulse width of the gate waveform 10 shown in FIG. 2, can be set to an arbitrary value by changing the amplitudes of the bias voltage and the sinusoidal voltage which are applied to the optical modulator 4. The gate function with short duration can be also obtained just with the sinusoidal voltage. This is one of large merits of this embodiment, because this single-frequency operation scheme does not require an ultra broad band electronic circuits, which is on the contrary essential to generate a driving electric pulse of short duration in conventional art. Sinusoidal voltages with slight distortion can be also used for driving pulses. A performance test of this embodiment was made using an InGaAsP $\lambda/4$ shift DFB laser oscillating at a single wavelength of 1.55 $\mu$m, as a transmitted optical signal source, and a semiconductor electro-absorption type optical modulator having an InGaAsP modulation waveguide of 1.45-$\mu$m forbidden band wavelength. It was ascertained in this test that the pulse width of the afore-mentioned gate waveform 10 could be changed arbitrarily between 150 and 40 picoseconds by changing the bias voltage from $-1$ V to $-4$ V by applying a modulation voltage (modulation power 23 dBm) of a 5-GHz sinusoidal wave in a 6.4V to the optical modulator 4. Conversely, by changing the amplitude of the 5-GHz sinusoidal voltage from 6V to 10 V while holding the bias voltage to the optical modulator 4 at $-3$ V at which an extinction ratio of 20 dB could be obtained, the pulse width of the gate waveform 10 changed from 40 to 80 picoseconds. By changing the bias voltage to the modulator and the amplitude of the modulation voltage, the pulse width of the gate waveform 10 can be set over an arbitrary range from 10 to 90% of a period of the modulation signal wave.

Furthermore, it has been ascertained that when the gate of the optical modulator 4 is in the closed state, almost all spectral noise components of the optical fiber amplifier 2 over a wavelength band from 1.52 to 1.58 $\mu$m can be eliminated. More specifically, when a bias voltage of $-6$ V was applied to the optical modulator 4 so that the optical signal having passed through the optical fiber amplifier 2 would be extinguished by 30 dB, spectral noise components of the optical fiber amplifier 2 over the 1.52 to 1.58 $\mu$m wavelength band were also attenuated in the range of 20 to 30 dB. Hence, by adjusting the delay time of the delay circuit so that the input to the optical modulator 4 is synchronized with a bit rate of the optical signal, and by suitably selecting the pulse width of the gate waveform, the optical signal becomes maximum at the maximum point of the gate waveform and excessive broadening of the waveform is eliminated, automatically correcting the timing jitter.

Thus, there is obtained, as the repeater output, a waveform-shaped and timing-synchronized optical output waveform 11 with no accumulated noise as shown in FIG. 2.

To verify this, a performance test was made in which an optical pulse train of a 12-GHz repetition period and a 45-psec pulse width, after having passed through the optical fiber amplifier, was applied to the optical waveform shaping device of this embodiment. In a case where the bias voltage for the optical modulator was $-2$ V, the amplitude of the sinusoidal voltage was 5.7 V and the DC voltage source, the delay circuit and the amplifier were adjusted so that the delay time would be timing-synchronized with a bit timing of the input pulse, a train of optical output pulses, each waveform-shaped to a 25-psec pulse width and timing-synchronized, was obtained. As a result of observation of their spectrums, it was found that the noise level of the output light dropped by about 3 dB because the accumulated noise, which was the sum total of noise of a plurality of optical amplifiers of the transmission system in a gate-closed state, were eliminated. Therefore, the waveform shaping device of this embodiment can be used as an optical repeater which performs waveform shaping and the timing synchronization and has an accumulated noise eliminating function.

Moreover, in a case where an optical amplifier, which has a gain saturation level near the power level necessary for the transmitted signal, is connected to the output of the optical modulator 4, slight polarization dependence from 0 to about 1 dB of insertion loss of the optical modulator is absorbed by the optical amplifier, providing a constant repeater output.

The feature of the optical waveform shaping device according to this embodiment resides in that the transmission distance of the optical soliton communication system of increased spacing of optical amplifiers can be made remarkably long by using the optical waveform shaping device as a repeater, for example, every 2000 km before the timing jitter presents a serious problem, since it is capable of waveform shaping, retiming and the elimination of noise regardless of polarization of the transmitted signal.

In a linear optical-amplifying communication system employing an ordinary return-to-zero code, it is also possible to make the transmission rate extremely high and the transmission distance remarkably long by using the optical waveform shaping device of this embodiment as a repeater before the broadening of a pulse by the wavelength dispersion by the optical fiber poses a serious problem, because it permits waveform shaping, retiming and elimination of noise regardless of polarization of the transmitted signal.

EMBODIMENT 2

Figure 3:
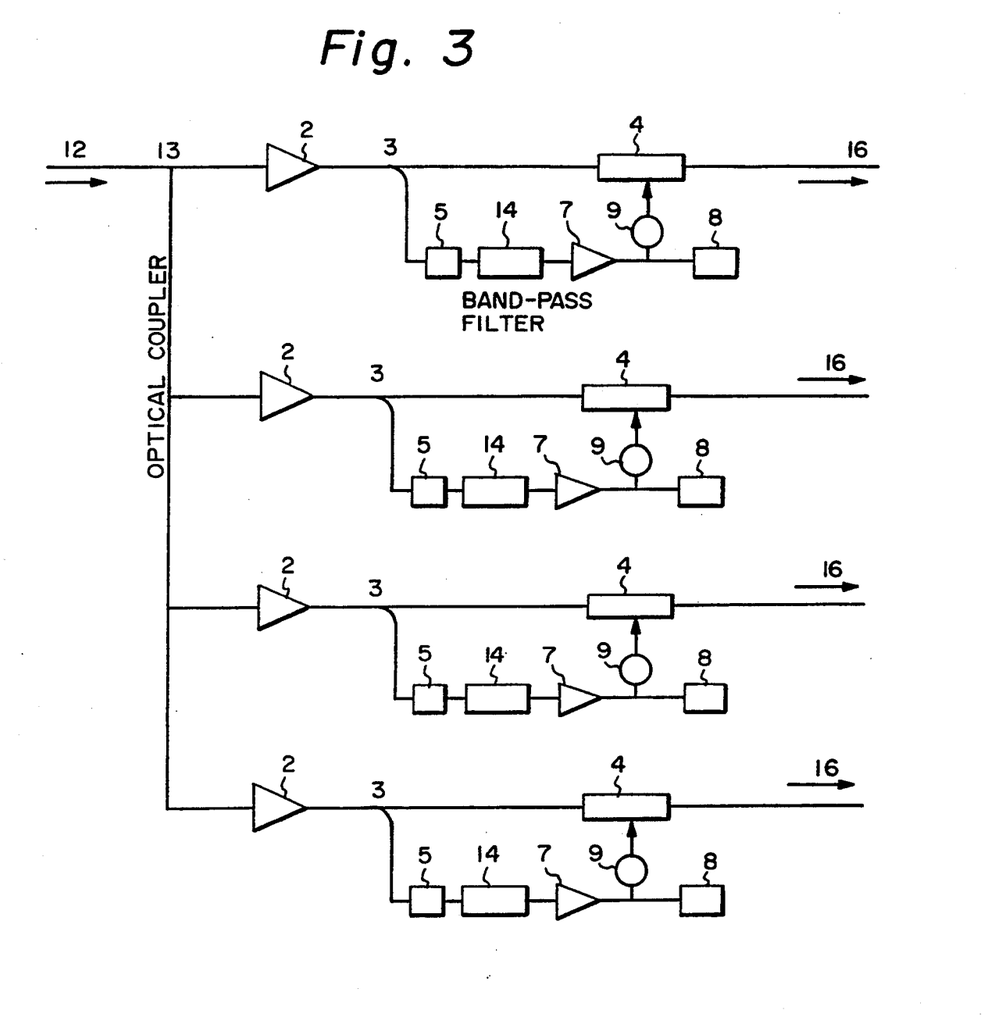
FIG. 3 is a block diagram illustrating an optical waveform shaping device which extracts an unmultiplexed optical signal from a time-multiplexed optical signal in accordance with a second embodiment of the present invention.
Figure 4:
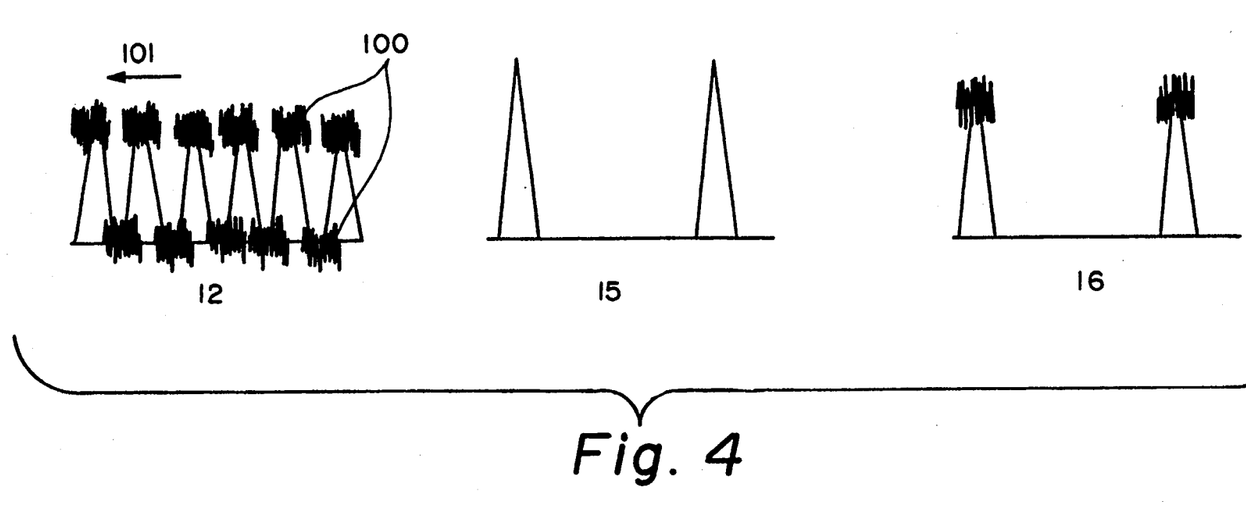
FIG. 4 is a diagram showing operating waveforms in the embodiment of FIG. 3.

FIG. 3 illustrates a second embodiment of the invention and FIG. 4 examples of operating waveforms. Assume that an optical pulse signal 12 transmitted over an optical fiber at a certain rate is formed by multiplexing, on the time domain, a plurality of optical pulse signals modulated at a rate, for instance, ¼ of the transmission rate. This embodiment of FIG. 3 has a structure wherein the time-multiplexed optical pulse signal 12 is branched by an optical coupler 13 into four signals and the optical pulse signal of a bit modulation rate prior to its multiplexing is derived from one of the four branched signals. This embodiment differs from the first embodiment in that each band-pass filter 14 in FIG. 3 is a band-pass filter which extracts substantially the fundamental frequency component only of the optical signal synchronized with a rate $\frac{1}{4}$ of the transmission rate of the time-multiplexed optical signal and in that the transfer function of the InGaAsP electro-absorption type optical modulator 4 in the time domain, that is, the pulse width of the gate waveform 15, is smaller than the time width which is a reciprocal of the transmission rate of the optical pulse signal 12. The pulse width of the gate waveform 15 does not matter, because it can be changed to an arbitrary value in accordance with the condition of modulation. With the optical waveform shaping device of this embodiment, it is possible to obtain an optical output 16 waveform shaped, timing-synchronized with a low transmission rate and with no accumulated noise.

In this embodiment, the transmission rate of the time-multiplexed optical pulse signal 12 was set to 10 Gb/s. The band-pass filter 14 was one that had a pass band of about 2.5 GHz, and the amplifier was set so that the sinusoidal output voltage would be 7.8 V. The DC bias voltage was set to $-2.2$ V. A coaxial line type delay circuit was used to synchronize the sinusoidal voltage with one series of optical pulse signals having a transmission rate of 2.5 Gb/s prior to the time multiplexing. As a result, an optical gate waveform synchronized with one series of optical pulse signals prior to the time multiplexing and having a width of 25 picoseconds was obtained, and a desired series of optical pulses prior to the time multiplexing was obtained as the output of this device. The optical pulse signals of the remaining three series could be separated by increasing their delay times of 25, 50 and 75 picoseconds from the above-mentioned delay time.

While this embodiment has been described in connection with the case of separating four multiplexed signal, the operation of separating a maximum of eight multiplexed signals was ascertained experimentally.

This embodiment is not limited specifically to the optical soliton communication but it may also be used as an optical waveform shaping device of an optical amplifying communication system using a return-to-zero code.

Figure 5:
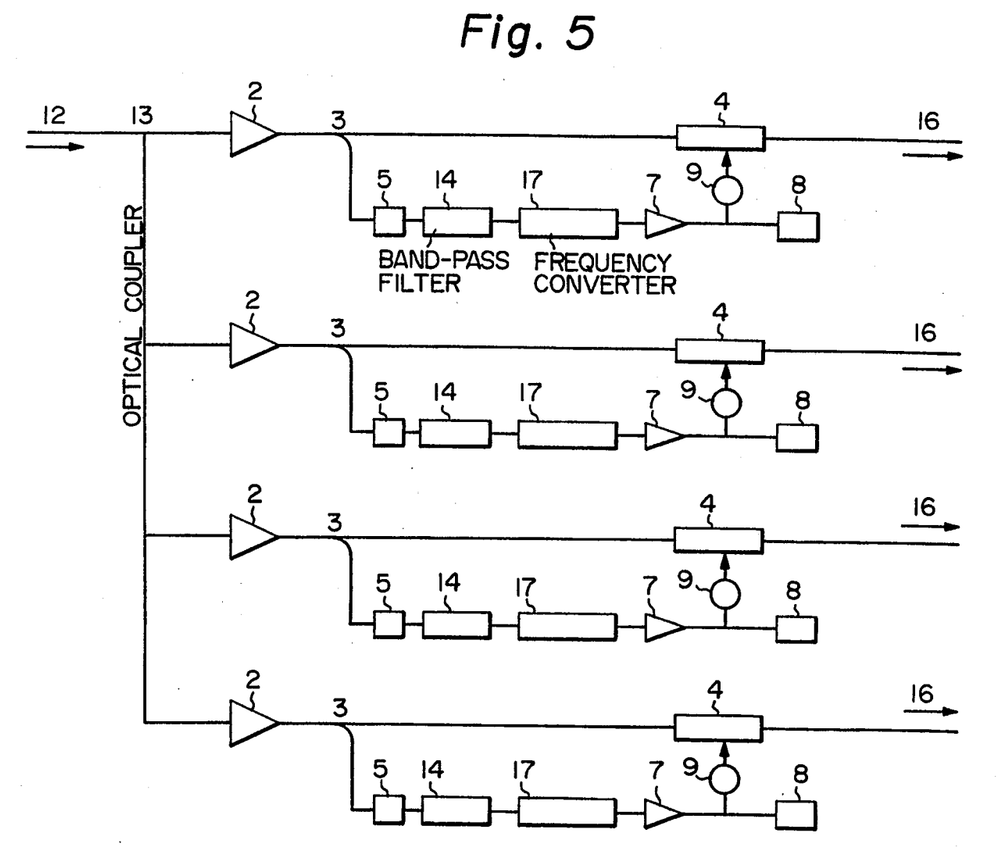
FIG. 5 is a block diagram illustrating a modification of the embodiment shown in FIG. 3.

Furthermore, although this embodiment employs the band-pass filter to extract the fundamental frequency component of the transmission rate prior to the multiplexing of signals, it may be-replaced by some other means capable of performing its function, such as a combination of a band-pass filter 14, which extracts substantially the fundamental frequency component of the multiplexed transmission rate, and a frequency converter 17, which converts the frequency component of the signal having passed through the band-pass filter into the fundamental frequency prior to the multiplexing, as shown in FIG. 5.

Figure 6:
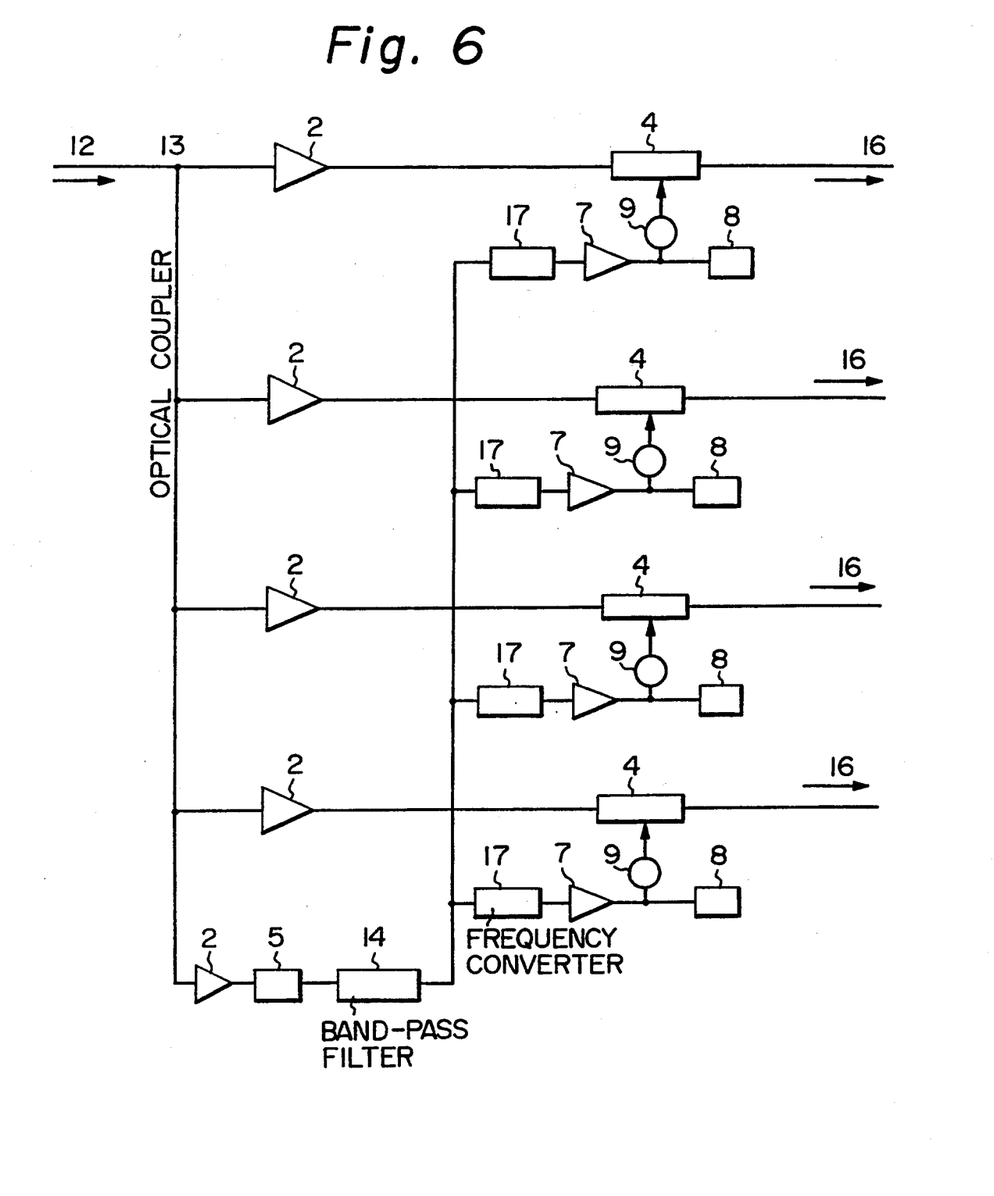
FIG. 6 is a block diagram illustrating another modification of the embodiment shown in FIG. 3.

The structure illustrated in FIG. 5 is also modified to circuitry illustrated in FIG. 6 since an output of the band-pass filter 14 can be applied in common to respective inputs to all the frequency converters 17.

The feature of the optical waveform shaping device according to this embodiment lies in that, when used at the receiving end of the time-multiplexed optical communication system, it serves as an optical demultiplexer which separates the multiplexed signals regardless of polarization of the transmitted signal and extracts the modulated signal prior to the multiplexing after waveform shaping, retiming and elimination of noise. According to this embodiment, since signals can be separated in the optical domain without the need of using ultra high-speed electrical circuits at transmitting and receiving ends, it is possible to achieve an ultra high-speed, ultra-large-capacity fiber optic communication.

EMBODIMENT 3

A third embodiment of the invention is an optical waveform shaping device whereby four multiplexed 10 GB/s optical pulse trains are separated in the ratios of 1 to 3 and 2 to 2. In this instance, the device is identical in construction with the embodiment shown in any of FIGS. 3, 5 and 6 in that the optical coupler 13 is modified to branch the input optical signal into two. The DC voltages, the sinusoidal modulation voltages and the delay times are set so that the optical gate waveforms of respective electro-absorption type optical modulators satisfy the complementary relationship in one period. More specifically, the conditions for operating the one optical modulator in the case of the 1 to 3 branching ratio are as follows: As for the optical modulator for extracting three series, the delay operation was delayed by 50 picoseconds, the bias voltage was $-0.4$ V, the modulation voltage was 7.2 V, and a gate waveform of a 75-psec width was formed which would satisfy the complementary relation-ship to the aforementioned optical gate waveform of the 25-psec width. As a result, one series of optical pulses prior to the multiplexing were obtained from the one optical modulator and the other three series of optical pulses were obtained from the other optical modulator. Moreover, by setting the bias voltage and the modulation voltage for each of the two optical modulators at $-1.8$ and 7.5 V, respectively, and by shifting only the delay times by 50 picoseconds, the four multiplexed signals can be separated in the ratio of 2 to 2. Similarly, an optical waveform shaping device was produced for separating 10-Gb/s optical pulse signals in the ratio of n to 8-n (where n=1, 2, 3, 4). As the DC voltage in a case where an optical gate of a width greater than 80% of the period was formed and the optical signals are separated in the ratio of 1 to 7, a positive voltage of $+0.4$ V, not the reverse or negative voltage, was used. Accordingly, the DC voltage source in this embodiment is not limited specifically to the reverse voltage of the optical modulator.

The device of this embodiment permits switching of multiplexed optical signals, and hence can also be utilizes as an optical switch at a branching point in a fiber optic communication network.

While in the above optical modulator has been described to be an InGaAsP electro-absorption type optical modulator, it is also possible to employ an absorption type optical modulator of a quantum well structure which is designed to reduce its polarization dependence and in which the quantum well layer is formed by an InGaAsP or InGaAs layer and the quantum barrier layer is formed by a layer of InP or InGaAsP which has an energy gap larger than that of the quantum well layer. It is also possible to use an absorption type optical modulator of an InGaAlAs/InAlAs or InGaAs/InAlAs quantum well structure.

The present invention of the above construction produces such merits as mentioned below.

The first optical waveform shaping device permits waveform shaping, retiming and the elimination of accumulated noise of the fiber amplifying system regardless of the state of polarization of the transmitted signal, and hence can be used as a repeater of the optical soliton communication system which suffers variations by polarization. Further, since the operation is conducted, in principle, at a single frequency, the device does-not need any high-speed electronic circuits, and hence its operation can easily be speeded up, making it possible to implement an ultrahigh-speed optical communication system of a remarkably long transmission distance. The second optical waveform shaping device, when disposed at the receiving end of a time-multiplex, ultrahigh-speed optical communication system, can be used as an optical demultiplexer which separates the time-multiplex signal in the optical domain regardless of the state of polarization of the transmitted signal. Moreover, it can be used also as an optical switch which divides the transmitted signal into an arbitrary ratio. Since the device performs, in principle, a single-frequency operation at a low frequency and does not call for any specific high-speed electronic circuits, an ultrahigh-speed optical communication system can readily be achieved.

What we claim is:

1. An optical waveform shaping device comprising:
    an optical branch circuit-for branching an input optical pulse signal into two optical pulse signals;
    a semiconductor electro-absorption type optical modulator for modulating one of the two branched optical pulse signals from said optical branch circuit to thereby perform its waveform shaping and retiming;
    a photodetector for receiving the other optical pulse signal from said optical branch circuit and for converting it into an electric signal;
    a band-pass filter for permitting the passage therethrough of a substantially sinusoidal voltage synchronized with a bit rate of said input optical pulse signal, which is the fundamental frequency component of the electric signal converted by said photodetector;
    an amplifier for amplifying the sinusoidal voltage having passed through said band-pass filter;
    a DC voltage source for applying a DC voltage to said semiconductor electro-absorption type optical modulator; and
    a delay circuit for receiving and delaying the sinusoidal voltage amplified by said amplifier and the DC voltage from said DC voltage source and for applying them to said semiconductor electro-absorption type optical modulator.

2. An optical waveform shaping circuit comprising:
    a first optical branch circuit for branching an input time-multiplexed optical pulse signal into a plurality of optical pulse signals;
    a plurality of second optical branch circuits each for branching one of a plurality of optical pulse signals branched from said first optical branch circuit into two optical pulse signals;
    a plurality of semiconductor electro absorption type optical modulators each for modulating one of said optical pulse signals branched from one of said plurality of second optical branch circuits to perform optical waveform shaping and retiming synchronization of said one optical pulse signal;
    a plurality of photodetectors each for receiving the other optical pulse signal from said one of the second optical branch circuits and for converting it into an electric signal;
    a plurality of means each for deriving from the electric signal converted by one of said plurality of photodetectors a substantially sinusoidal voltage synchronized with a bit rate of an unmultiplexed input optical pulse signal, which is the fundamental frequency component of said optical pulse signal;
    a plurality of amplifiers each for amplifying said sinusoidal voltage having passed through one of said plurality of means;
    a plurality of DC voltage sources each for supplying a DC voltage to one of said semiconductor electro-absorption type optical modulators; and
    a plurality of delay circuits each for receiving and delaying said sinusoidal voltage amplified by one of said plurality of amplifiers and the DC voltage from one of said plurality of DC voltage sources and for applying them to one of said semiconductor electro-absorption type optical modulators;
    characteristics of said delay circuits, said DC voltage sources and said amplifiers being preselected so that at least one desired series of optical pulse signals is derived from said time-multiplexed optical pulse signals through any of said plurality of semiconductor electro-absorption type optical modulators.

3. An optical waveform shaping device according to claim 2, characterized in that said plurality of means are each composed of a band-pass filter for permitting the passage therethrough of the substantially sinusoidal voltage synchronized with a bit rate of said unmultiplexed input optical pulse signal, which is the fundamental frequency component of said unmultiplexed optical pulse signal.

4. An optical waveform shaping device according to claim 2, characterized in that said plurality of means are each composed of a band-pass filter for extracting the substantially fundamental frequency component of the transmission rate after multiplexing and of a frequency converter, which converts the frequency component of the signal having passed through said band-pass filter into the fundamental frequency component of said unmultiplexed optical pulse signal.

5. An optical waveform shaping device for performing waveform shaping, retiming and amplification in a binary pulse-code-modulation fiber optic communication system by the use of an optical pulse signal having a pulse duty factor within 1 with respect to a time slot, comprising:
    an optical branch circuit for branching said optical pulse signal into two optical pulse signals;
    a first path receptive of one of said two optical pulse signals and comprising a cascade connection of a photodetector, a band-pass filter, which extracts substantially the fundamental frequency component, an amplifier and a delay circuit to obtain a sinusoidal voltage synchronized with a bit rate of said optical pulse signal;
    a DC voltage source;
    a second path receptive of the other of said pulse signals;
    a semiconductor electro-absorption type optical modulator connected to the second path and driven by said sinusoidal voltage and a DC voltage from said DC voltage source; and
    the amplitude of said sinusoidal voltage and said DC voltage being used to drive said semiconductor electro-absorption type optical modulator, to control the width of a gate waveform on the time domain of said semiconductor electro-absorption type optical modulator so as to perform waveform equalization and retiming synchronization of said optical pulse signal.

6. An optical waveform shaping device for performing waveform shaping, retiming and amplification for time-sharing separation of a multiplexed signal in a binary pulse-codemodulation fiber optic communication system by the use of a signal obtained by time-division multiplexing an optical pulse signal into a plurality of pulse trains through bit interleaving, and said optical pulse signal having a pulse duty factor with 1 with respect to a time slot, comprising:

main branch means for branching said optical pulse signal into a plurality of optical pulse signals;

a plurality of subsidiary branch circuits each for branching a corresponding one of said plurality of optical pulse signals into two local optical pulse signals;

a plurality of first paths each receptive of one of said two local optical pulse signals and each comprising a cascade connection of a photodetector, a band-pass filter, which extracts the fundamental frequency component of the transmission rate prior to the multiplexing, an amplifier and a delay circuit to obtain a substantially sinusoidal voltage synchronized with a bit rate of said optical pulse signal prior to its multiplexing;

a plurality of DC voltage sources;

a plurality of second paths each receptive of the other of said two local optical pulse signals;

a plurality of semiconductor electro-absorption type optical modulators each of which is connected to a corresponding one of said second paths and driven by said sinusoidal voltage and a DC voltage from a corresponding one of said DC voltage sources; and the amplitude of each of said sinusoidal voltages and said DC voltages being used to drive each of said semiconductor electro-absorption type optical modulators, each of said semiconductor electro-absorption type optical modulators being controlled so that the gate width on the time domain is smaller than the time width which is a reciprocal of the transmission rate of the multiplexed optical pulse signal and at least one train of pulse signals is separated from said multiplexed signal, and so that the separated optical pulse signals can be subjected to waveform equalization and retiming synchronization.

* * * * *